Oct. 2, 1923.

G. W. WALTON 1,469,468

STROPPING DEVICE

Filed Sept. 18, 1920

Inventor
GEORGE W. WALTON.

By Watson E. Coleman
Attorney

Patented Oct. 2, 1923.

1,469,468

UNITED STATES PATENT OFFICE.

GEORGE W. WALTON, OF MISSION, TEXAS.

STROPPING DEVICE.

Application filed September 18, 1920. Serial No. 411,026.

*To all whom it may concern:*

Be it known that I, GEORGE W. WALTON, a citizen of the United States, residing at Mission, in the county of Hidalgo and State of Texas, have invented certain new and useful Improvements in Stropping Devices, of which the following is a specification, reference being had to the accompanying drawings.

This invention relates to devices for stropping razors.

An important object of the invention is to provide a device of this character which may be used for stropping straight razors.

A further object of the invention is to provide a device of this character which may be cheaply constructed, and which is particularly adapted for use in barber shops, and the like.

Other objects and advantages of the invention will become apparent throughout the course of the following description.

In the accompanying drawings, wherein for the purpose of illustration is shown a preferred embodiment of my invention, and wherein like reference characters designate like parts throughout:

Figure 1 is a plan view of a razor stropping machine constructed in accordance with my invention;

Figure 2 is a side elevation partly in section thereof;

Figure 3 is a section on the line 3—3 of Figure 2;

Figure 4 is a detail view showing the pulley shifting mechanism, and

Figure 5 is an end elevation of one of the pulley bearing shafts and pulley.

Referring now more particularly to the drawings, the numeral 10 indicates a suitable base, having mounted centrally thereof a motor 11 the armature shaft 12 of which is disposed transversely of the base and is provided upon its end with pulleys 13 and 14.

Mounted in bearings 15 are shafts 16 and 17 disposed upon opposite sides of the motor and bearing rollers 18 and 19 respectively. The outer ends 20 of the shafts 16 and 17 beyond bearings 15 are provided with lugs 21 adapted to coact with notches 21$^a$ formed in pulleys 21$^b$, which pulleys are normally rotatable upon the shafts beyond such lugs.

Means for shifting the pulleys 21$^b$ to bring them into engagement with the lugs of their respective shafts are provided consisting in levers 22 pivotally connected at one end of the base and having bifurcated upper ends 24 engaging in the groove formed by an extension 25 upon the pulleys. An operating thumb piece 26 is connected to the levers 22 for shifting the same. Pulleys 21$^b$ are connected with the pulleys 13 and 14 and with the armature shaft 12 by means of belts 27 and 28.

At opposite ends of the base 10 and extending transversely thereof are shafts 29 and 29$^a$ bearing rollers 30 and 31, respectively, the ends of the shafts being mounted in suitable anti-friction bearings 32. These bearings are supported upon transversely extending plates 33.

Extending inwardly from each end of the base at the approximate center thereof are slots 35 having formed in the side walls thereof grooves 36. Formed on the under surface of each of the plates 33 is a downwardly extending portion 37 extending into the slot 35 and embodying shoulders 38 engaging in the grooves 36. It will be obvious that the plates 33 are longitudinally shiftable upon the base, but are held against angular displacement with relation thereto. Extending longitudinally of the slot is a threaded shaft 39 held against longitudinal shifting and provided upon its outer end with a knurled thumb nut by means of which it may be rotated. These shafts extend through threaded openings 40 formed in the downward extensions 37 of the plates 33 and have threaded engagement therewith, whereby rotation of the thumb nut will cause shifting of its associated plate longitudinally of the base. Extending about the rollers 18 and 30 is a canvas sharpening belt 42 and extending about the rollers 19 and 31 is a leather finishing belt 41.

It will be seen that by adjustment of the thumb nuts the belts 41 and 42 may be tightened as desired, and it will likewise be seen that either of the belts may be driven from the motor singly or both belts may be driven simultaneously as desired. I prefer that the motor 11 shall be of the reversible type in order to permit driving of the belts in either direction.

Extending upwardly from the side and ends of the base are side and ends walls 43 combining with the base to form a casing which is normally closed by a cover 44 in order to protect the belts and their associated mechanism from dust and dirt when not in use.

It will be obvious that my device, by reason of its simplicity, is particularly well adapted for the use for which it is intended, and it will likewise be obvious that the construction of the same as hereinbefore set forth may be altered somewhat without in any manner departing from the spirit of my invention. I accordingly do not limit myself to the specific structure as hereinbefore set forth, except as so limited by the subjoined claims.

What I claim is:

1. In a razor stropping device, a casing including a base, a reversible motor arranged on the base within the casing and having the armature shaft thereof extending transversely of the base, a pair of shafts rotatably mounted upon said base to one side of said motor, means operable from the exterior of the casing for adjustably varying the distance between the shafts of said pair, a stropping belt driven by the pair of shafts, and means for connecting said pair of shafts to the armature shaft of said motor to be driven thereby, comprising a pulley secured to said armature shaft, a second pulley mounted upon one shaft of said pair of shafts, means operable from the exterior of the casing for shifting said second pulley longitudinally of said shaft, and a lug formed upon the shaft bearing the second pulley, said second pulley being provided with a notch adapted for the reception of said lug.

2. In a razor stropping device, a casing including a base, a motor mounted on said base and having the armature shaft thereof extending transversely of the base, a pair of parallel shafts rotatably mounted upon said base, means for adjustably varying the distance between the shafts of said pair, comprising a member extending transversely of the base at the end thereof upon which one of the shafts of the pair is rotatably mounted, said transversely extending member being provided with a downwardly extending portion provided upon the sides thereof with outstanding shoulders, said base having formed in the end thereof a longitudinally extending slot having grooves formed in the side walls thereof, said downwardly extending member being slidably mounted on said slit and having the shoulders thereof engage in the grooves, a shaft rotatably mounted approximately centrally of said slot and held against longitudinal movement therein, said shaft having threaded engagement with said downwardly extending member, and having an end portion thereof extended exteriorly of the casing and provided with means whereby it may be rotated, a stropping belt driven by the pair of shafts and means operable from the exterior of the casing for connecting one of said pair of shafts to the armature shaft of the motor to be driven thereby.

In testimony whereof I hereunto affix my signature.

GEORGE W. WALTON.